United States Patent
Eryurek et al.

(10) Patent No.: US 8,200,783 B2
(45) Date of Patent: Jun. 12, 2012

(54) FIELD-BASED ASSET MANAGEMENT DEVICE AND ARCHITECTURE

(75) Inventors: Evren Eryurek, Melbourne, FL (US); Mark S. Schumacher, Minneapolis, MN (US); Marcos Peluso, Chanhassen, MN (US); Robert J. Karschnia, Chaska, MN (US); Christopher Wells, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 428 days.

(21) Appl. No.: 11/501,220

(22) Filed: Aug. 8, 2006

(65) Prior Publication Data

US 2007/0038700 A1 Feb. 15, 2007

Related U.S. Application Data

(60) Provisional application No. 60/706,626, filed on Aug. 9, 2005.

(51) Int. Cl.
*G06F 15/16* (2006.01)
(52) U.S. Cl. ......... 709/218; 709/210; 709/220; 709/226
(58) Field of Classification Search .................. 709/218
See application file for complete search history.

(56) References Cited

U.S. PATENT DOCUMENTS

| | | | |
|---|---|---|---|
| 5,793,963 A * | 8/1998 | Tapperson et al. ............ | 709/201 |
| 6,317,701 B1 * | 11/2001 | Pyotsia et al. ................ | 702/188 |
| 6,330,525 B1 * | 12/2001 | Hays et al. .................... | 702/183 |
| 6,618,630 B1 | 9/2003 | Jundt ............................ | 700/17 |
| 6,640,308 B1 * | 10/2003 | Keyghobad et al. .......... | 713/300 |
| 6,765,968 B1 * | 7/2004 | Nelson et al. ................. | 375/257 |
| 7,010,294 B1 * | 3/2006 | Pyotsia et al. ................ | 455/420 |
| 2001/0025323 A1 * | 9/2001 | Sodergren .................... | 709/251 |
| 2002/0123856 A1 * | 9/2002 | Eryurek ....................... | 702/140 |
| 2004/0153594 A1 | 8/2004 | Rotvold et al. ............... | 710/305 |
| 2006/0212161 A1 * | 9/2006 | Bhat et al. .................... | 700/197 |
| 2010/0063614 A1 * | 3/2010 | Rosenboim et al. .......... | 700/121 |

FOREIGN PATENT DOCUMENTS

| | | |
|---|---|---|
| RU | 2 211 471 | 8/2003 |
| RU | 2 232 352 | 7/2004 |
| WO | WO 2004/086160 | 10/2004 |

(Continued)

OTHER PUBLICATIONS

Anonymous: "Using the Rosemount 3420 for Bulk Inputs and Skid Mounted Monitoring Solutions" Internet Article, [Online] May 2004, pp. 1-2.*

(Continued)

*Primary Examiner* — Jeffrey Pwu
*Assistant Examiner* — Sulaiman Nooristany
(74) *Attorney, Agent, or Firm* — Christopher R. Christenson; Westman, Champlin & Kelly, P.A.

(57) ABSTRACT

A field mountable interface module is provided. The intelligent interface module includes at least one data connection port configured to couple to a data communication network as well as at least one process communication connection port configured to couple to a field device bus. The intelligent interface module also includes a controller and memory coupled to the controller. The controller is configured to provide a higher order function with respect to one or more field devices and/or field device buses. Higher order functions include calibration support, complex device support, diagnostic support, distributed control system support, and virtual field device functions.

6 Claims, 7 Drawing Sheets

FOREIGN PATENT DOCUMENTS

WO  WO 2004086160 A1 * 10/2004

OTHER PUBLICATIONS

Anonymous: "The Rosemount 3420 Fieldbus Interface Module allows Fieldbus Process Monitoring in ANY Plant!" Internet Article, [Online] Mar. 5, 2004, pp. 1-3.*

Anonymous, "Using the Rosemount 3420 for Bulk Inputs and Skid Mounted Monitoring Solutions," Internet Article, May 2004, pp. 1-2.

Anonymous, "The Rosemount 3420 Fieldbus Interface Module Allows Fieldbus Process Monitoring in ANY Plant," Internet Article, Mar. 5, 2004, pp. 1-3.

Anonymous, "New Emerson Interface Connects Monitoring Applications of FOUNDATION™ Fieldbus Devices to Legacy Hosts," Internet Article, Apr. 7, 2003, p. 1.

Anonymous, "Fieldbus Interface Module," Internet Article, Jul. 2004, pp. 1-8.

Anonymous, "High-Performance Process Manager Specification and Technical Data," Internet Article, Dec. 1999, pp. 1-52.

The International Search Report and Written Opinion from Application No. PCT/US2006/030966, filed Aug. 8, 2006.

Examination Report from Application No. 06801008.1, filed Aug. 8, 2006.

"Fieldbus Interface Module," Rosemount, Inc., Product Data Sheet, Feb. 2006, p. 1-12.

"Rosemount 3420 FIM," Rosemount Inc., Application Note, May 2004, p. 1-2.

"User Interface Revisions: AMS Suite: Intelligent Device Manager, 375 Field Communicator," Rosemount Inc., Jan. 2006, p. 1-39.

First Office Action for Chinese patent application No. 200680028337.7, dated Sep. 11, 2009.

"ActiveX-based remote bus calibration system" (2005), 4 pages.

Hao Zhang et al., "Multimedia and Digital Tele-diagnosis/Tele-engineering System for Complicated Industry Equipment," (1999), 5 pages.

Official Action for Russian patent application No. 2008108965, dated Feb. 25, 2010.

Decision of the Russian Federation Patent Office on Grant of the Patent for the Russian patent application No. 2008108965 dated Aug. 23, 2010.

First Office Action for Japanese patent application No. 2008-526150 dated Jan. 13, 2011.

Summons to attend oral proceedings and Request for Written Submissions for European patent application No. 06801008.1 dated May 31, 2011.

Decision of Refusal (final rejection) for the Japanese patent application No. 2008526150 dated Jul. 12, 2011.

Second Office Action for the related Chinese patent application No. 200680028337.7 dated Nov. 10, 2011.

First Official Action for Russian patent application No. 2008108965, dated Oct. 26, 2009.

"Total Plant Solution (TPS) System. High Performance Process Manager Specification and Technical Data," Honeywell (Dec. 1999), p. 14, fourth paragraph.

L.M. Nevdyaev, "Telecommunications Technologies. English Russian Explanatory Reference Book." International Centre of Scientific and Technical Information, p. 171, year 2002.

Decision of Refusal for related European patent application No. 06801008.1 dated Dec. 15, 2011.

* cited by examiner

FIELD-BASED ASSET MANAGEMENT DEVICE AND ARCHITECTURE

CROSS-REFERENCE TO RELATED APPLICATION

The present application is based on and claims the benefit of U.S. provisional patent application Ser. No. 60/706,626, filed Aug. 9, 2005, the content of which is hereby incorporated by reference in its entirety.

BACKGROUND OF THE INVENTION

Process monitoring and control systems, such as those used in chemical processes, petroleum, or other types of industrial processes, typically include a centralized monitoring and control system communicatively coupled to a workstation of an operator or a user and to one or more field devices via analog or digital communication paths. Field devices can include sensors adapted to monitor processor parameters (such as temperature, pressure, flow rate, and the like) and/or actuators adapted to perform operations on the industrial process (such as opening and closing valves, and so on).

Generally, the centralized monitoring and control system receives signals indicative of process measurements made by the field devices and/or information pertaining to the field devices via an input/output (IO) device or module, which may be analog or digital. Monitoring systems receive signals indicative of process measurements and monitor various aspects of a process based on the received signals. Monitoring systems can be adapted to compare measure process data against pre-determined limits and to initiate actions (such as generating an alarm signal) if the limit is exceeded.

A process controller of a monitoring and control system can use the measurements and other information to monitor a process and to implement a control routine. The process controller can generate control signals, which can be sent over buses or other communication paths or channels via an analog or digital I/O device to the field device(s) to control the operation of a particular process.

Control of an industrial plant is a very complex and critical process. Effective control depends not only on accurately sensing all relevant process variables, but also effectively interacting with the process via transducers such as valve actuators, et cetera. A given process installation may include tens or even hundreds of field devices cooperating to facilitate process control. Over time, it may become necessary to perform routine maintenance, repair, or calibration on various field devices in order to ensure that such devices are able to effectively execute their process measurement and/or control tasks.

In the context of process control, asset management is a term that refers collectively to a large penumbra of functions relative to field devices. Asset management includes diagnostics and monitoring of field devices and/or other process control assets; configuration management of such devices; calibration of field devices; documentation of field devices; as well as enterprise integration. In fact, an entire array of asset management related products are available in the AMS™ Suite available from Fisher-Rosemount Systems, Inc., of Austin, Tex. The AMS™ Suite includes such products as AMS Portal, AMS Device Manager, AMS Machinery Manager, AMS Performance Monitor, and AMS Optimizer. Additional information regarding these products can be found at http://www.emersonprocess.com/optimize/amssinde.htm.

Providing more effective asset management for field devices in industrial process control and management would represent a significant benefit to the art.

SUMMARY

A field-mountable intelligent interface module is provided. The intelligent interface module includes at least one data connection port configured to couple to a data communication network as well as at least one process communication connection port configured to couple to a field device bus. The intelligent interface module also includes a controller and memory coupled to the controller. The controller is configured to provide a higher-order function with respect to one or more field devices and/or field device buses. Higher order functions include calibration support, complex device support, diagnostic support, distributed control system support, and virtual field device functions.

DETAILED DESCRIPTION

Figure 1:
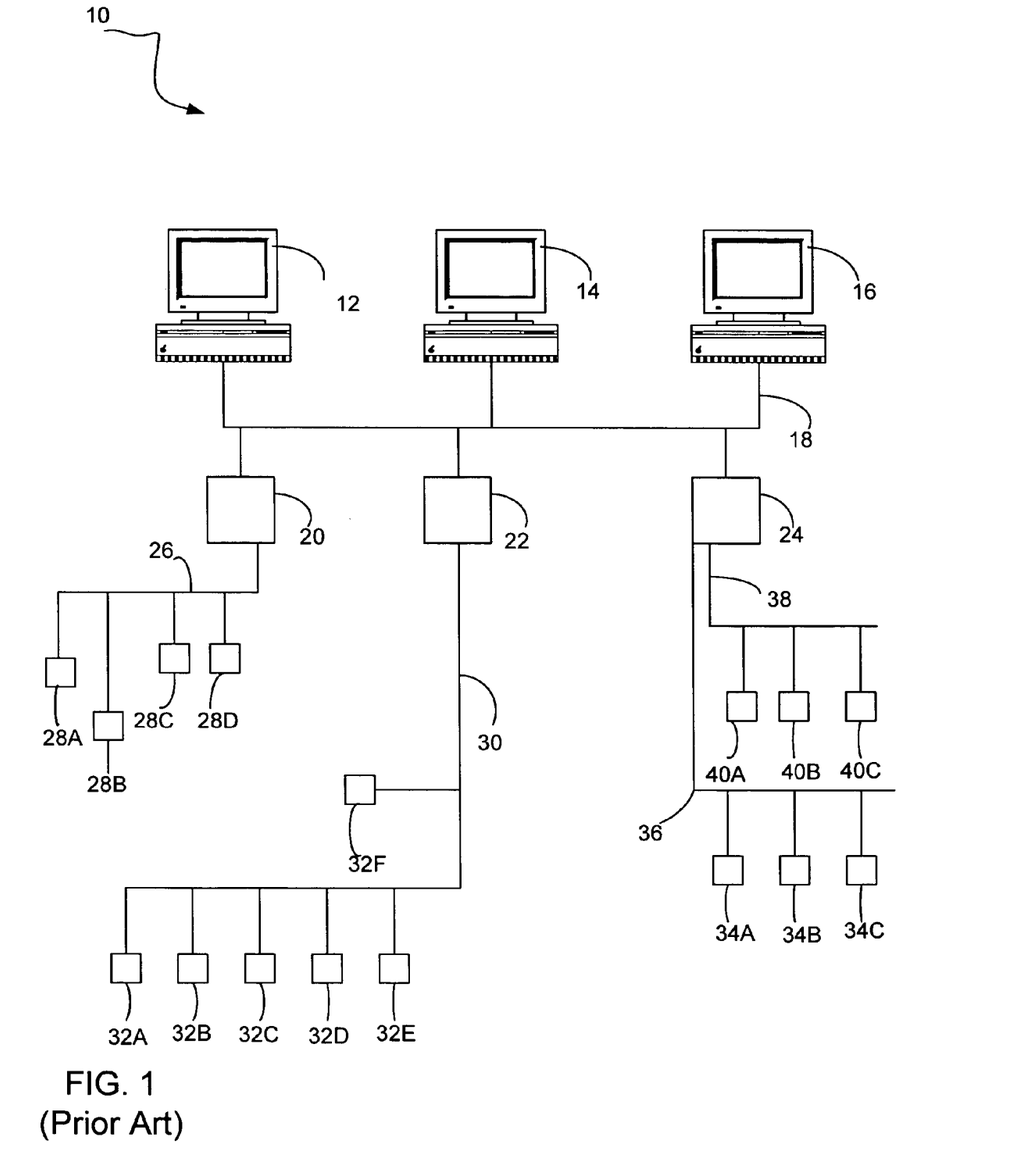
FIG. 1 is a diagrammatic view of a process control and measurement installation in accordance with the prior art.

FIG. 1 is a diagrammatic view of a process control and measurement installation in accordance with the prior art. System 10 includes a plurality of workstations 12, 14, 16 coupled together via a local area network, such as an Ethernet network 18. A plurality of field device multiplexers 20, 22, 24 are also coupled to Ethernet local area network (LAN) 18. Each of multiplexers 20, 22, 24 is a known device that is able to interface between a process industry standard communication network and local area network 18. For example, multiplexer 20 is a HART® multiplexer that is able to interface between HART® communication loop 26 and LAN 18. Thus, field devices 28A, 28B, 28C, 28D, which are coupled to HART® communication loop 26 are accessible, to one degree or another, to workstation 12, 14, 16 via interface device 20. Similarly, multiplexer device 22 is an interface between LAN 18 and Hi FOUNDATION™ Fieldbus process communication segment 30. Thus, fieldbus devices 32A, 32B, 32C, 32D, 32E and 32F are accessible, in one form or another to workstations 12, 14, 16 through multiplexer 22.

Field devices 34A, 34B, and 34C are coupled to process communication loop 36 and communicate in accordance with the ASI process communication protocol. ASI loop/segment 36 is coupled to multiplexer 24, which is coupled to DeviceNet segment or loop 38 to which field devices 40A, 40B and 40C are coupled. Through multiplexers 20, 22 and 24, any or all of workstations 12, 14 and 16 are able to execute and perform core asset management functions with respect to any or all of the field devices. Such functions include diagnostics and monitoring of various field devices, configuration management of field devices, calibration support relative to any or all of the field devices, documentation, including audit trail, notes and drawings of any or all field devices, as well as enterprise integration.

In accordance with embodiments of the present invention, higher level interaction with one or more field devices is provided by employing an intelligent interface module, similar to that sold under the trade designation Model 3420 available from Rosemount Inc., of Chanhassen, Minn.

Figure 2:
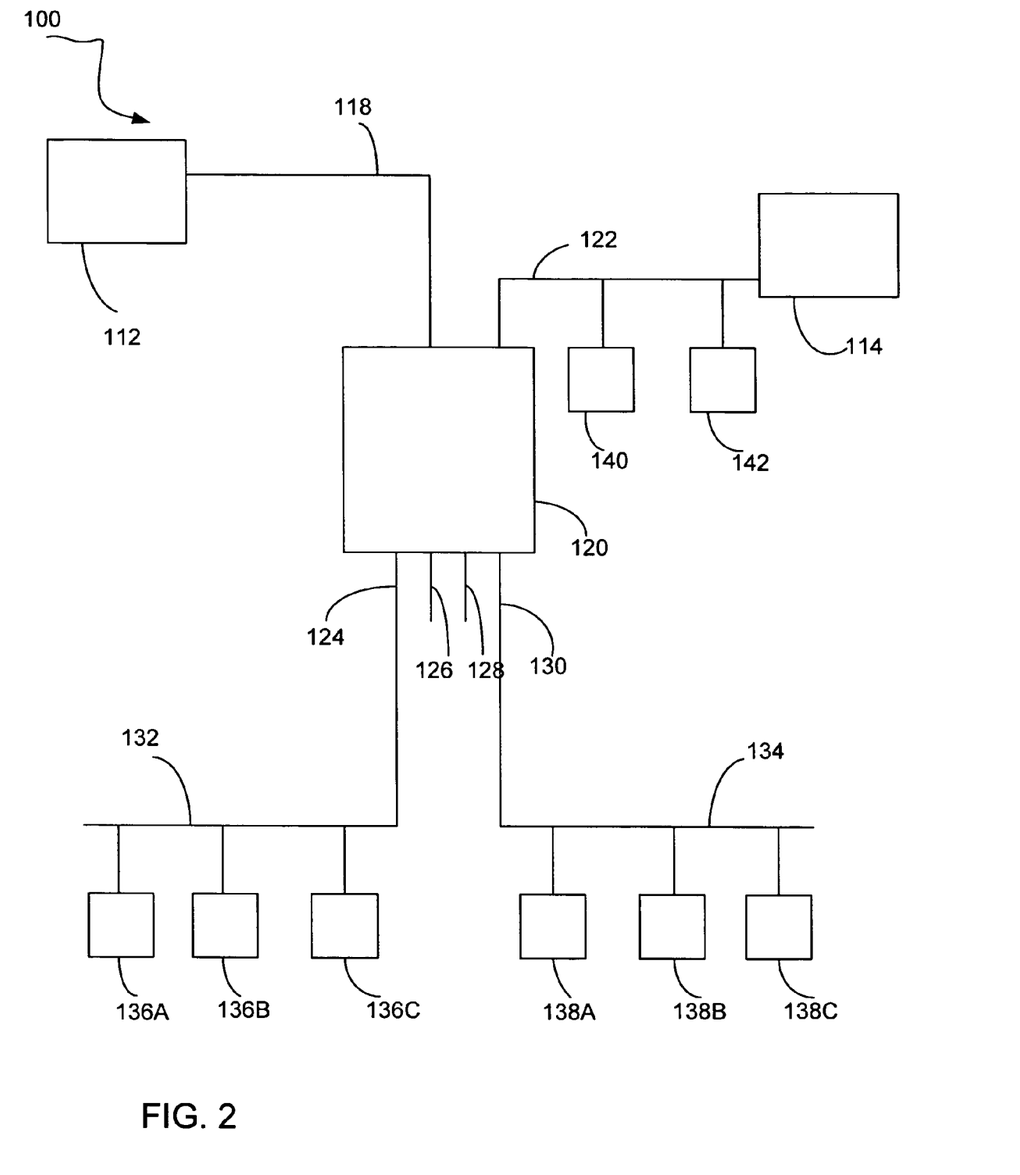
FIG. 2 is a diagrammatic view of a process control and measurement installation in accordance with an embodiment of the present invention.

FIG. 2 is a diagrammatic view of a process measurement and control system 100 in accordance with an embodiment of the present invention. System 100 includes workstations 112 and 114 which are each coupled to intelligent interface module 120 through Ethernet network 118 and ModBus network 122, respectively. Intelligent interface module 120 includes a plurality of segment connection ports 124, 126, 128 and 130. Ports 124 and 130 are illustrated as being coupled to a plurality of process communication loops or segments, 132 and 134, respectively. Loop 132 is illustrated as a HART® communication loop, but may comprise any suitable process communication protocol. Loop 132 is able to couple up to 36 field devices 136A, 136B, 136C. Similarly, loop 134 is a FOUNDATION™ Fieldbus process communication segment. However, any suitable process industry communication protocols for ports 124, 126, 128 and 130 in accordance with embodiments of the present invention. Loop 134 is coupled to field devices 138A, 138B and 138C, but may couple any suitable number of devices depending on the process communication protocol.

Each of ports 124, 126, 128 and 130 is designed to couple to a particular process communication loop or segment having a particular process communication protocol. Thus, intelligent interface module 120 can be ordered to have any four ports for operation with one or more specified process communication protocols. As illustrated further in FIG. 2, embodiments of the present invention also include employing a plurality of intelligent interface modules, since modules 140 and 142 are illustrated as also coupled to ModBus 122. Intelligent interface module 120 provides access to field device functions and/or higher-order asset management functions and control and/or monitoring functions, which will be disclosed in greater detail below. Additionally, intelligent interface module 120 also preferably includes an integrated web server such that interaction with the various functions provided by module 120 can be via a commercially available browser software executed on workstation 112, or 114.

Currently, more and more field device manufacturers are providing field devices that do not need calibration for five to ten years or more in some cases. Such field devices generally contain enough intelligence and memory to not only manage their own calibration trends locally after each calibration, but to also maintain several years of calibration data within their memories. As the proliferation of such intelligent field devices increases, the use of higher-order field device functions, such as asset management, using one or more intelligent interface modules becomes increasingly important.

Figure 3:
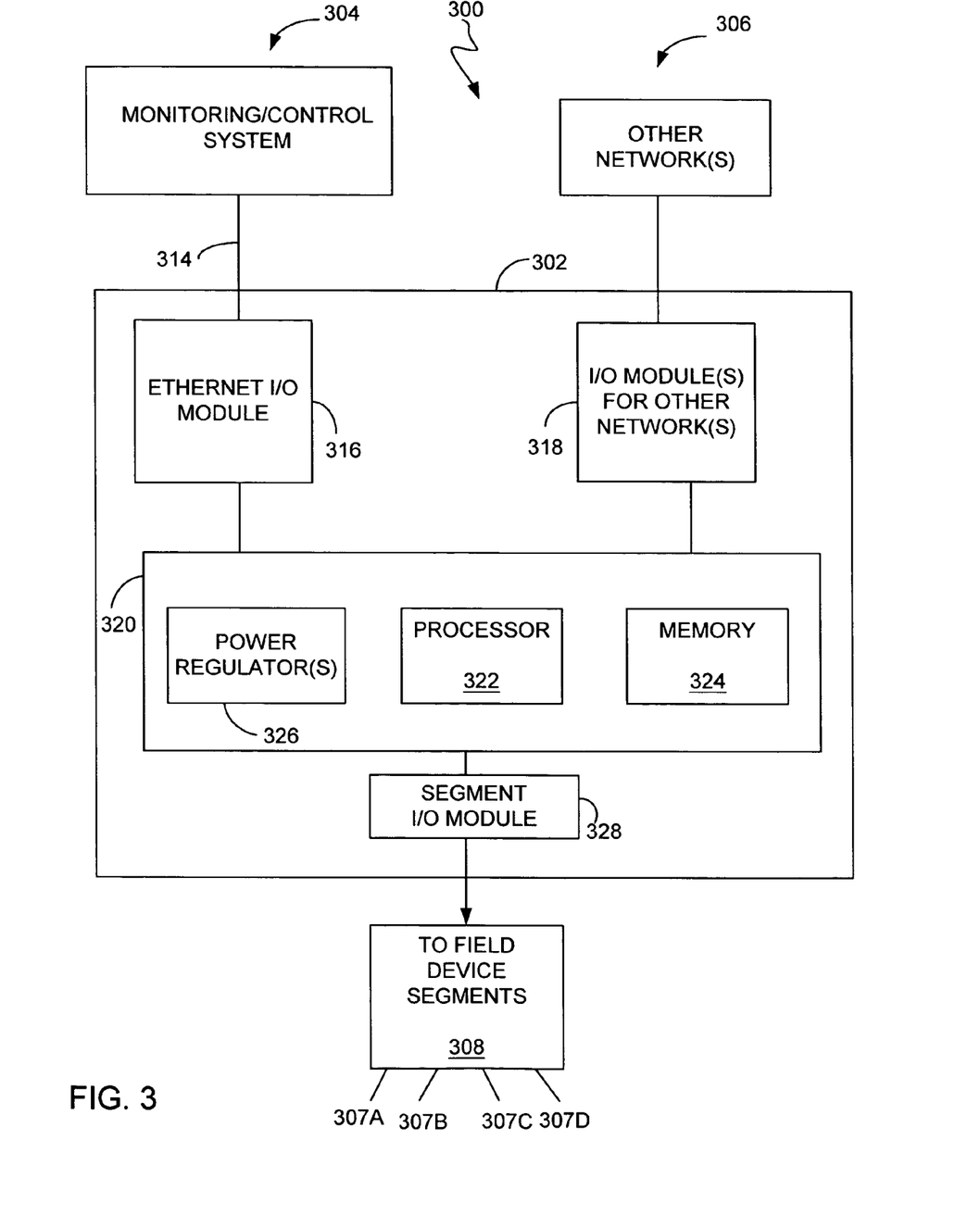
FIG. 3 is a block diagram of an intelligent interface module in accordance with an embodiment of the present invention.

FIG. 3 is a block diagram of an intelligent interface module within a process monitoring and control system according to an embodiment of the present invention. Generally, intelligent interface module 302 is adapted to provide bi-directional data transmissions between the plurality of field device buses 307A-307D and the one or more control networks 304 and 306. Intelligent interface module 302 generally includes an Ethernet Input/output (I/O) module (or Ethernet interface) 316 and optionally one or more network I/O modules (or other network interfaces) 318 adapted to communicate with the control networks 304 and 306. Controller 320 can include a processor 322, a memory 324 and one or more power regulators 336. Controller 320 is coupled to a plurality of I/O modules, such as segment I/O module 328, for delivering power to and communicating with a plurality of field devices. For example, I/O module 328 can be a segment I/O module adapted to communicate with field device segments 307A. Yet another module can be a bus or network I/O module for communicating with field device bus or network 307B. Still another module can be a wireless transceiver adapted to communicate via a wireless network 307C with one or more field devices adapted to communicate wirelessly. Finally, still another module can be a 4-20 mA HART® I/O module coupled to a HART® network 307D to which field devices are coupled.

Controller 320 is adapted to perform a variety of functions relative to the industrial process through various field devices. Controller 320, via processor 322, can process stored data pertaining to one or more of the field devices (to condition the information for use by the control system 310) and/or to compare measurements against stored reference data from memory 324. Controller 320 can communicate with the control system 310 via Ethernet cable 314 and/or with other intelligent interface modules in a digital or combined digital-analog format. Additionally, each field device and/or intelligent interface module 302 can be adapted to perform secondary functions, such as calibration, identification, diagnostics and the like.

Controller 320 forms the basis for intelligent interface modules 302. Controller 320 is generally able to execute instructions stored therein, and/or instructions stored in memory 324 to perform a variety of suitable functions. One function that facilitates higher-order interactions is the provision, by controller 320, of web server functionality. Thus, users located at workstation 112, or 114, can quickly and easily interact with intelligent interface module 302 using convenient and ubiquitous browser software. Higher-order functions, which will be described in greater detail below, include, but are not limited to, calibration support; support for complex devices; relaying device diagnostics; and device enablers for higher level functions within a distributed control system or asset management package; and providing high level diagnostics relative to a control loop, or a particular piece of process equipment, such as a heat exchanger.

Figure 4:
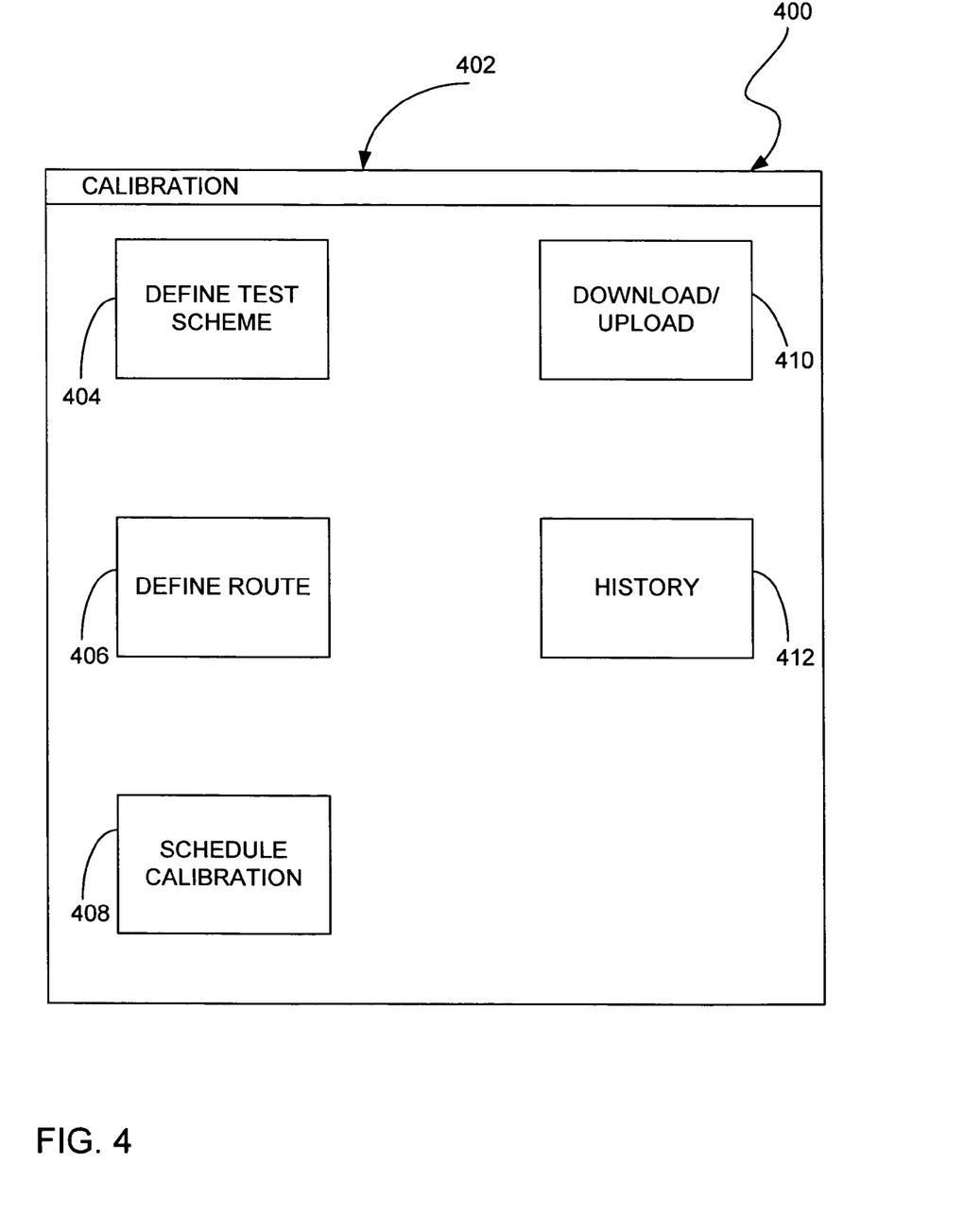
FIG. 4 is a diagrammatic view of a user interface provided by an intelligent interface module in accordance with an embodiment of the present invention.

FIG. 4 is a diagrammatic view of an exemplary user interface 400 provided by intelligent interface module 120, 302 in accordance with an embodiment of the present invention. Preferably, interface 400 is provided by web server software running on controller 320 in response to a request from a client browser, such as a client browser on work station 112. Interface 400 includes a title bar 402 indicating that the array of functions listed therein is related to calibration. Interface 400 includes a user interface element 404 that, when selected, allows a remote user to define a test scheme. As defined herein, a "test scheme" is a pre-selected set of one or more calibration operations to be performed upon a specific field device. A calibration operation generally includes applying a known physical condition, such as temperature or pressure, to a field device and observing the field device's response thereto. Conversely, a calibration operation can also include applying a known signal to a field device and actually measuring a physical effect of the signal, such as valve displacement. Generally, a field device will require a plurality of calibration options and defining a test scheme ahead of time for storage in intelligent interface module 302, may allow the technician to perform the overall calibration more effectively.

User interface element 406, when selected, allows a remote user to define a route. A given process installation may utilize many field devices. On any given technician run, a number of field devices may need maintenance. Defining a route allows a remote user to generate an order in which the technician should address the field devices requiring maintenance for a particular run, or on a particular day.

User interface element 408, when selected, allows a remote user to schedule field device calibrations. Intelligent interface module 120, 302 will expose indications of all field devices coupled thereto. A remote user of intelligent interface module 120, 302 can then set calibration schedules for any and all attached field devices. Calibration schedules can include defining a particular interval at which calibrations should be effected and/or defining a particular date by which, or on which calibrations should be performed.

User interface element 410 allows a user thereof to download and/or upload data from/to documenting calibrators. Documenting calibrators are known devices that field device maintenance technicians use to apply known conditions to a field device, adjust the field device in accordance with the known conditions, and document the adjustment. Downloading data to documenting calibrators includes, but is not limited to, downloading one or more test schemes defined by the user and/or downloading a route that the technician should employ during the maintenance run. Uploading data includes, but is not limited to, uploading records indicative of adjustments made to one or more field devices, as well as any other suitable information that the documenting calibrator may have obtained during the maintenance run. When a user is interacting with intelligent interface module 120, 302 via workstation 114, this upload/download process may simply include coupling the documenting calibrator to workstation 112 in accordance with known techniques. However, as set forth above, intelligent interface module 120, 302 may include a wireless transceiver. It is further contemplated that a documenting calibrator may also include a wireless transceiver such that a field technician having a documenting calibrator with a wireless transceiver within range of intelligent interface module 120, 302 could potentially interact directly with interface module 120, 302 in any suitable manner, including via its web server interface. Thus, the upload/download functions could be effected between the documenting calibrator and interface module 120, 302 without the use of workstation 112.

Interface 400 also includes user interface element 412 which, when selected by a user, will display data indicative of calibration history. Calibration history can be selected to be specific to a particular field device, or group of field devices, and can be grouped, displayed, or reported in any suitable manner.

Figure 5:
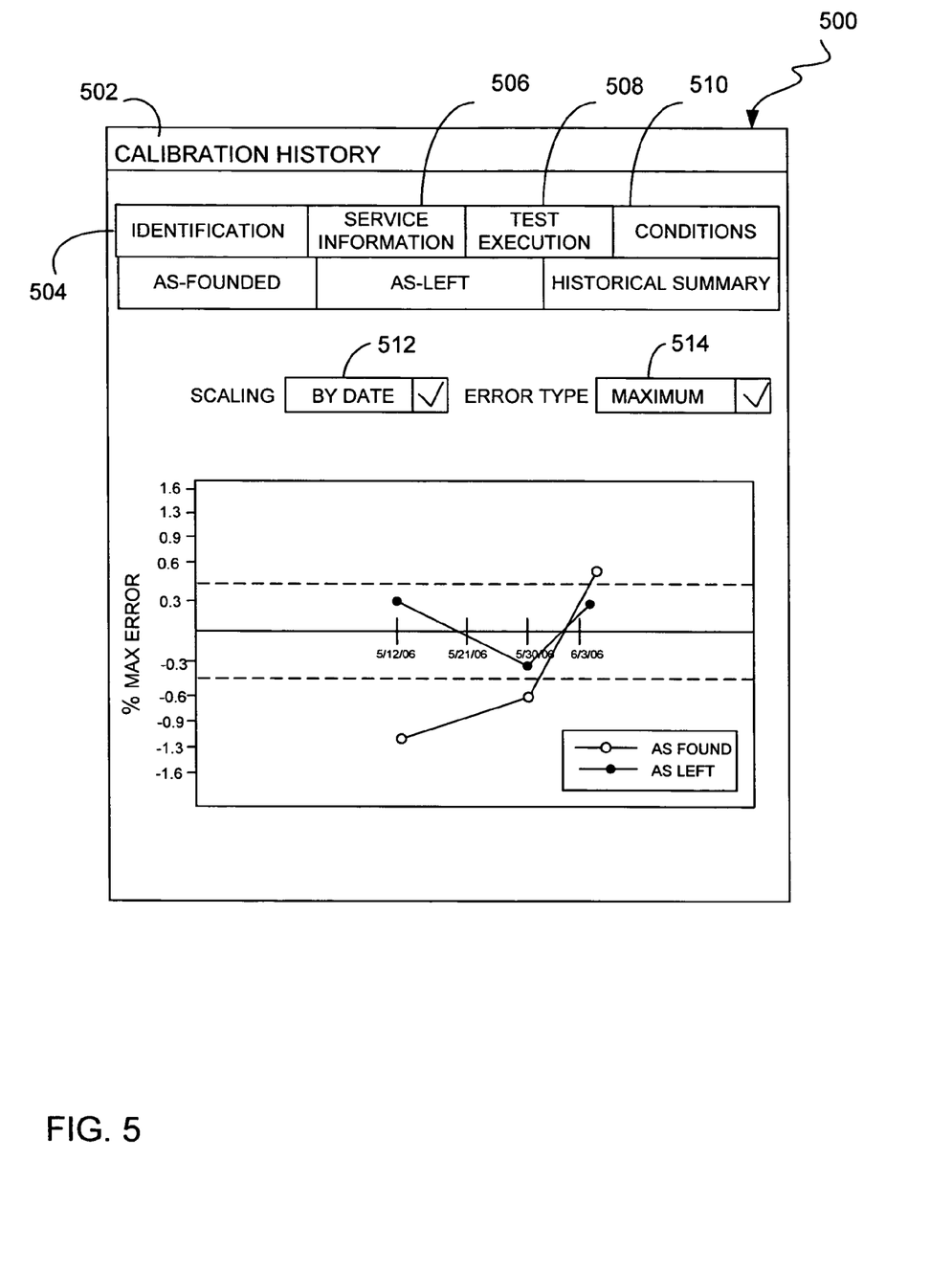
FIG. 5 is a diagrammatic view of another user interface provided by an intelligent interface module in accordance with an embodiment of the present invention.

FIG. 5 is a diagrammatic view of an exemplary screen provided in response to a user selecting interface element 412. User interface 500, like user interface 400, is preferably provided by controller 320 and web server software executed thereon. Interface 500 includes a title bar indicating that the contents or information displayed therein is "Calibration History." Calibration history can be viewed, or arranged in a number of ways is preferably interacted with by a user clicking on tabs 504, 506, 508, or 510. Clicking on tab 504 arranges or displays information regarding identification of field devices for which calibration history is available. Clicking on tab 506 provides service information regarding one or more selected field devices. Clicking on tab 508 provides information arranged or displayed with respect to test equipment used for calibration, and clicking on tab 510 displays a number of test conditions or other factors present during calibration. Display 500 can display as found/as left information as well as historical or summary information with respect to one or more field devices. In particular, FIG. 5 indicates a particular field device where the error is scaled by date, and the error type displayed is "Maximum." Certainly, other forms of scaling and error types are within the scope of embodiments of the present invention and can be selected by interacting with drop-down boxes 513, 514, respectively. FIG. 5 indicates that the particular field device has been calibrated three times with the first calibration finding the device (as found) with a percent maximum error of −1.3, and an as left value of approximately +0.3 maximum error. The second calibration finds the device with percent maximum error with approximately −0.6, and an as left maximum error of approximately −0.3%. The final calibration finds the field device with a percent maximum error approximately +0.6, and an as-left error of approximately +0.3. Those skilled in the art will recognize that a vast array of calibration history display and reporting options can be used in accordance with embodiments of the present invention. A particular advantage stems from the fact that this calibration information and variable calibration information displayed and reporting is provided by intelligent interface module 120, 302 which is a field-mountable unit. Thus, significant changes can occur to the data network utilized by the process installation as well as by any of workstations 112, 114. However, calibration information is easily available simply by pointing any workstation's browser at the network address of intelligent interface module 120, 302.

Another important function provided by intelligent interface module 120, 302 is that of supporting complex field devices. Examples of complex field devices include, but are not limited to, the multi-variable mass flow transmitter sold by Rosemount Inc., of Eden Prairie, Minn., under the trade designation Model 3095 MV; as well as Rosemount's products sold under the trade designations Mass ProBar®; and Mass ProPlate™ Flowmeter. Additional complex field devices include, but are not limited to, coriolis meters and radar level transmitters. One of the complexities of such devices comes from the fact that they are able to measure one or more process variables, but may provide an additional process variable that is based on a calculation using one or more of the measured process variables. Typically, aspects of the calculation vary depending on physical properties of a particular application, such as the density or chemical makeup of a particular fluid. In this regard, intelligent interface module 302 includes, within memory 324, a physical property database of process fluids (both gasses and liquids). Using any suitable and/or known calculations intelligent interface module 120, 302 can combine process variable information measured or received by one or more attached field devices, with fluid information stored within the physical property database within memory 324 to dynamically calculate density, compressibility, viscosity, or any other suitable fluid related data.

Figure 6:
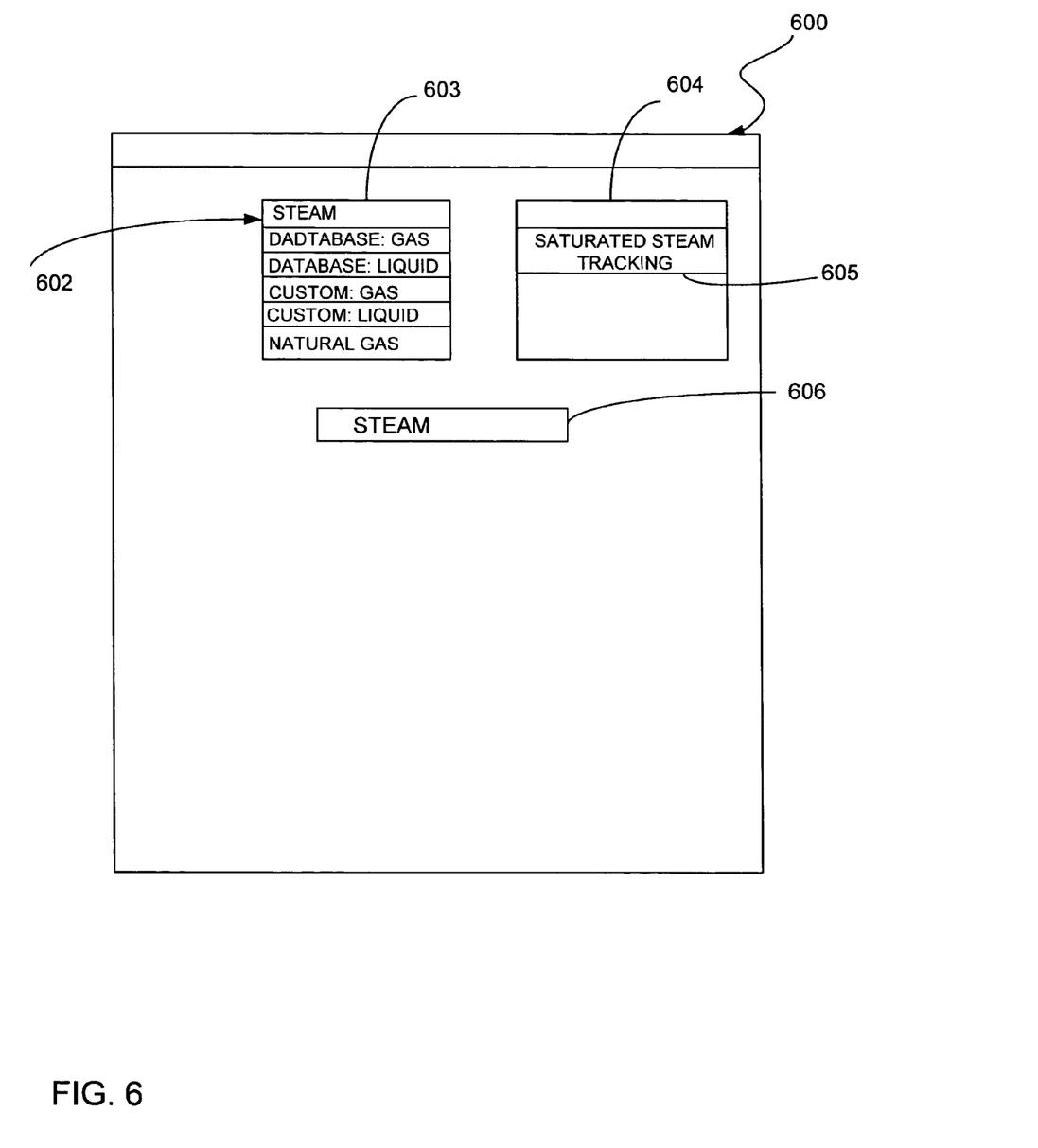
FIG. 6 is a diagrammatic view of yet another user interface provided by an intelligent interface module in accordance with an embodiment of the present invention.

FIG. 6 is a diagrammatic view of one exemplary user interface provided by controller 320 to support complex field devices as described above. Specifically, interface 600 allows a user thereof to select the type of process fluid to which the complex field device is exposed. Window 602 includes possible selections for Database: Steam; Database: Gas; Database: Liquid; Custom: Gas; Custom: Liquid; and Natural Gas. As illustrated in FIG. 6, selection of a particular fluid type, such as steam 603, will populate window 604 with various functions that can be calculated, or otherwise provided by intelligent interface module 604. One example of such a function is saturated steam tracking 605. Finally, window 606 indicates the name of the process fluid.

In accordance with an embodiment of the present invention, intelligent interface module 120, 302 can also provide enhanced diagnostic support. For example, intelligent interface module 120, 302 preferably monitors and stores information related to each of the field devices to which it is connected. One such example includes tracking the maximum temperature and pressure to which each field device is exposed. Generally, field devices may measure and store information related to the maximum temperature and/or pressure to which they are exposed. However, if a catastrophic incident occurs and the field device is irreversibly damaged, such information may be lost. In distinct contrast, intelligent interface module 120, 302 stores such information, preferably including the time at which the maximum temperature and/or pressure occurred, at a location remote from the actual field device. Thus, if a catastrophic incident occurs to a field device, the data is not lost.

Intelligent interface device 120 also provides higher levels of diagnostics on larger equipment, such as pumps, heat exchangers, and control loop diagnostics. Pump diagnostics can be done by utilizing known pump curves as well as the pressure and differential pressure measurements observed by one or more field devices disposed both upstream and downstream from the pump. Pump curves can be easily replicated within intelligent interface module 120 by using a 4-point curve fit for a given pump performance curve in comparison with the pressure and/or differential pressure measurements. Further details regarding pump diagnostics can be found in U.S. Pat. No. 6,954,713 issued to Fisher-Rosemount Systems, Inc.

Figure 7:
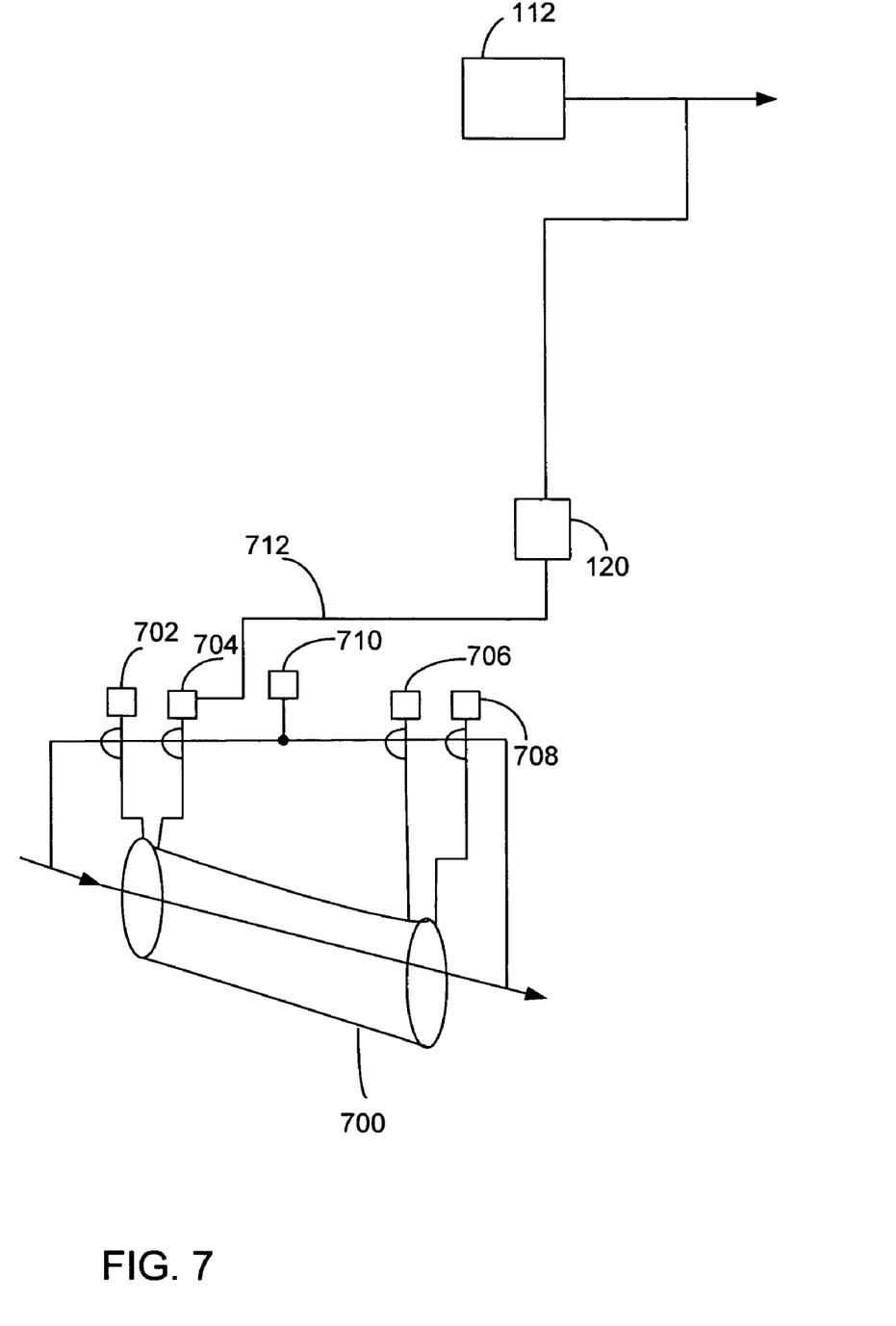
FIG. 7 is a diagrammatic view of an intelligent interface module interacting with a number of field devices to provide high order diagnostics with respect to a complex field device.

FIG. 7 is a diagrammatic view of an intelligent interface module 120 providing high level diagnostics (fouling monitoring) with respect to a relatively complex piece of equipment; heat exchanger 700. As illustrated, field devices 702 and 704 are disposed upstream of heat exchanger 700 while field devices 706 and 708 are disposed downstream therefrom. Field devices 702 and 704 may measure, for example, upstream temperature and gauge pressure while downstream field devices 706 and 708 may measure downstream gauge pressure and temperature. Additionally, field device 710 is configured to measure differential pressure across heat exchanger 700. These various field devices provide process variables on process communication loop 712 which is coupled to intelligent interface module 120. Intelligent interface module 120 monitors upstream process variables, downstream process variables, and a differential pressure across heat exchanger 700 and is able to quickly diagnose problems such as heat exchanger 700 becoming plugged, or developing leaks.

Yet another important function of the diagnostics provided by intelligent interface module 120, 302 relates to relaying and/or processing diagnostic information available on the one or more process communication loops to which the intelligent interface module is connected. For example, diagnostic information from one or more field devices can be analyzed and/or summarized and then relayed accordingly upon one or more data communication paths, such as the Ethernet communication link. Alternatively, field device diagnostic information could simply be relayed by intelligent interface module 120, 302 from the field process control loop(s) to the data communication network.

Intelligent interface module 120, 302 also provides higher order functions to assist with a distributed control system (DCS) or asset management package. Examples of such device enablers include monitoring, storing and analyzing process variable data, or other suitable data to provide known Statistical Process Control functions. Statistical Process Control is a known technology whereby process variability over time is studied such that a given process can be characterized. Additionally, Statistical Process Control can be used to quickly identify when a process begins to go out of control, and can help identify potential sources of errors.

Yet another important function that can be provided by intelligent interface module 120, 302, by virtue of its sophisticated controller and coupling to various field devices, is that intelligent interface module 120, 302 can be configured to be, or provide the functions of, a virtual field device. When operated as a virtual field device, configuration and/or control techniques and algorithms can be selected, or otherwise changed via the easy-to-use web server interface, and any attached field devices can be essentially mapped as inputs or outputs to the virtual field device. Relationships between one or more inputs and one or more outputs such as process variable outputs and/or alarm outputs can also be selected.

Although the present invention has been described with reference to preferred embodiments, workers skilled in the art will recognize that changes may be made in form and detail without departing from the spirit and scope of the invention.

What is claimed is:
1. A field device interface module comprising:
a plurality of wired data network connection ports configured to couple to respective data communication networks, wherein a first data connection port of the plurality of data connection ports is an Ethernet port and a second data connection port is Modbus port;
a plurality of process communication connection ports, the plurality of process communication connection ports including a wireless process communication connection port configured to couple to a wireless field device bus and provide bi-directional wireless communication of data between wireless field devices connected to the wireless field device bus and the field device interface module, the plurality of process communication connection ports also including a wired process communication port configured to deliver power to and communicate with a plurality of wired field devices, and wherein at least two distinct process communication protocols are supported by the plurality of process communication connection ports;
a controller;
memory coupled to the controller;
wherein the controller is configured to provide diagnostics including monitoring and storing diagnostic data related to one or more of the field devices and the controller being configured to provide information pertaining to the diagnostic data to one or more control networks via at least one wired data network connection port;
wherein the at least two distinct process communication protocols include Highway Addressable Remote Transducer (HART) and FOUNDATION Fieldbus;
wherein the controller and memory are configured to provide web server functionality:
wherein the controller stores information related to a maximum temperature or pressure to which each field device is exposed;
wherein the controller further stores information related to a time at which the maximum temperature or pressure occurred;

wherein the field device bus is connected to a first field device positioned upstream from a heat exchanger and a second field device positioned downstream from the heat exchanger;

wherein the controller stores information related to a gauge pressure observed by each of the first and second field devices; and wherein the controller stores information related to a temperature observed b each of the first and second field devices.

2. The field device interface module of claim 1, wherein the controller is configured to relay information present on the at least one field device bus to the at least one data communication network.

3. The field device interface module of claim 1, wherein the information pertaining to the diagnostic data comprises a summary of the diagnostic data.

4. The field device interface module of claim 1, wherein the field device interface module is configured to communicate wirelessly with a documenting calibrator.

5. The field device interface module of claim 1 further comprising an input/output module for communication with the one or more control networks.

6. A field device interface module comprising:
- a plurality of wired data network connection ports configured to couple to respective data communication networks, wherein a first data connection port of the plurality of data connection ports is an Ethernet port and a second data connection port is Modbus port;
- a plurality of process communication connection ports, the plurality of process communication connection ports including a wireless process communication connection port configured to couple to a wireless field device bus and provide bi-directional wireless communication of data between wireless field devices connected to the wireless field device bus and the field device interface module, the plurality of process communication connection ports also including a wired process communication port configured to deliver power to and communicate with a plurality of wired field devices, and wherein at least two distinct process communication protocols are supported by the plurality of process communication connection ports;
- a controller;
- memory coupled to the controller;
- wherein the controller is configured to provide diagnostics including monitoring and storing diagnostic data related to one or more of the field devices and the controller being configured to provide information pertaining to the diagnostic data to one or more control networks via at least one wired data network connection port; and
- wherein the at least two distinct process communication protocols include Highway Addressable Remote Transducer (HART) and FOUNDATION Fieldbus;
- wherein the controller and memory are configured to provide web server functionality;
- wherein the controller stores information related to a maximum temperature or pressure to which each field device is exposed;
- wherein the controller further stores information related to a time at which the maximum temperature or pressure occurred;
- wherein the field device bus is connected to a first field device positioned upstream from a pump and a second field device positioned downstream from the pump;
- wherein the controller stores information related to a gauge pressure observed by each of the first and second field devices; and
- wherein the controller stores information related to a temperature observed by each of the first and second field devices.

* * * * *